United States Patent [19]

Takahashi et al.

[11] 4,320,962

[45] Mar. 23, 1982

[54] IMAGE FORMATION METHOD AND APPARATUS

[75] Inventors: Tohru Takahashi, Tokyo; Yasuyuki Tamura, Kawasaki, both of Japan

[73] Assignee: Canon Kabushiki Kaisha, Tokyo, Japan

[21] Appl. No.: 190,409

[22] Filed: Sep. 24, 1980

[30] Foreign Application Priority Data

Oct. 2, 1979 [JP] Japan .................................. 54/127036

[51] Int. Cl.³ ........................................... G03G 15/00
[52] U.S. Cl. ................. 355/14 C; 346/153.1; 355/8; 355/3 R; 355/77; 358/300
[58] Field of Search ............... 355/14 R, 14 C, 3 R, 355/8, 77; 346/160, 153.1; 358/296, 300, 302; 354/5

[56] References Cited

U.S. PATENT DOCUMENTS

| | | | |
|---|---|---|---|
| 4,122,462 | 10/1978 | Hirayama et al. | 355/3 R |
| 4,167,324 | 9/1979 | Wu | 355/3 R |
| 4,251,152 | 2/1981 | Miyakawa et al. | 355/3 R |
| 4,255,040 | 3/1981 | Weigl et al. | 355/3 R |
| 4,257,701 | 3/1981 | Hirayama et al. | 355/8 |
| 4,267,548 | 5/1981 | Kimura et al. | 355/3 R |

*Primary Examiner*—Richard L. Moses
*Attorney, Agent, or Firm*—Fitzpatrick, Cella, Harper & Scinto

[57] ABSTRACT

In the image formation effected by combining different original images, a plurality of original images to be combined are photoelectrically converted into time-sequential signals and stored in predetermined memory means, the memory signals corresponding to the original images stored in the memory means are read out with a predetermined time relationship therebetween and the desired memory signals are combined to obtain an image signal, and an image is formed in accordance with the combined image signal.

10 Claims, 7 Drawing Figures

IMAGE FORMATION METHOD AND APPARATUS

BACKGROUND OF THE INVENTION

1. Field of the Invention

This invention relates to an image formation method and apparatus whereby an overlay image is obtained by combining different original images, and more particularly to an image formation method and apparatus in which different original images are converted into time-sequential electrical signals and such signals are combined and a combined image is obtained on the basis of the combined signal.

2. Description of the Prior Art

As a typical method of obtaining an overlay image, there is a method which comprises cutting out a portion of a sheet of original paper to form a window and copying with another original peeping out from this window. This method, however, is inconvenient in cumbersomeness of the procedure involved and damage imparted to the original. As another example, there is a method which comprises projecting an original by an optical system, and causing a character pattern electrically generated by a character generator to be depicted so as to be superposed on the projected original by the scanning of a laser beam or the like. This method does not require the procedure of cutting out a portion of the original paper and accordingly does not involve the danger of damaging the original, whereas it has suffered from a problem that it is very difficult to intercept the optical image of the desired portion of the original. Moreover, the limitation resulting from the utilization of the character pattern generated by the character generator is great.

SUMMARY OF THE INVENTION

It is an object of the present invention to provide a novel and excellent image formation method and apparatus.

It is a further object of the present invention to provide an image formation method and apparatus which enable free combined images to be obtained by a simple operation.

The image formation method of the present invention is a method of forming an image by combining different original images which comprises the steps of storing a plurality of original images to be combined as time-sequential signals in predetermined memories, reading out the signals in the memories with a predetermined time relationship maintained therebetween and combining the desired memory signals to obtain an image signal, and forming an image in accordance with the image signal.

The image formation apparatus of the present invention is characterized by the provision of photoelectric converter means for photoelectrically converting original images while scanning the same, a plurality of memory means which can be read out simultaneously, input image signal control means for controlling the input image signal of the photoelectric converter means so as to be sent to predetermined memory means, starting time control means for controlling the read-out starting time from each of the memory means, combining means for combining the read-out signals from the memory means, light signal forming means for converting the combined signal formed by the combining means into a light signal, and means for forming a combined image on the basis of the light signal of the light signal forming means.

The invention will become more fully apparent from the following detailed description thereof taken in conjunction with the accompanying drawings.

DESCRIPTION OF THE PREFERRED EMBODIMENTS

Figure 1:
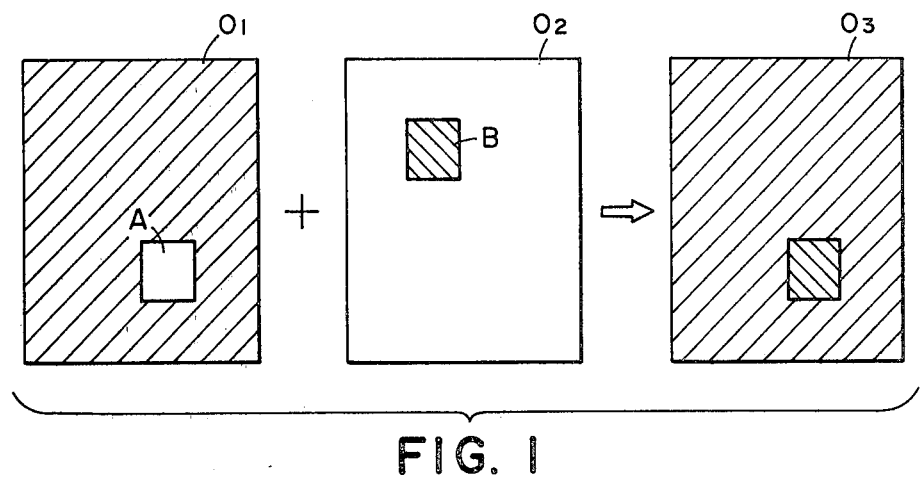
FIG. 1 is a schematic view illustrating the image combination according to the present invention.
Figure 2:
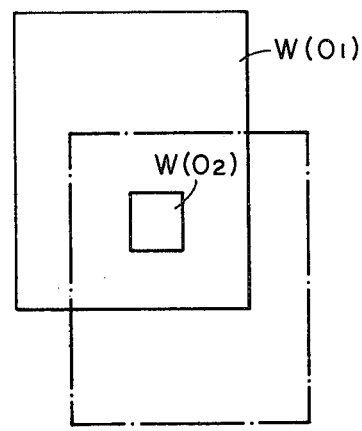
FIG. 2 illustrates the basic concept of the method of the present invention.

FIG. 1 is a schematic view illustrating the image combination according to the present invention. In the image combination, it is expected that for example, from two different originals $O_1$ and $O_2$, a new combined image $O_3$ is obtained by inserting the portion B of the original $O_2$ into the portion A of the original $O_1$ as shown. In a case where the originals differ in size, as well as in a case where the originals are equal in size as illustrated, the portions thereof to be combined are often incoincident with each other when the two originals are superposed one upon the other. In order to combine the thus different locations of the originals, it is a usually conceivable method to read the originals and memorize the same, thereafter combine and process the memory signals in a control mechanism in accordance with a predesignated address. In this case, however, the image formation must be waited for in the control mechanism until the editing work is terminated, and such waiting time is several minutes to several tens of minutes depending on the speed of CPU or the like. Moreover, of course, the processing program is complicated. On the contrary, the method of the present invention does not require a complicated processing program but enables similar image combination to be achieved with said waiting time being greatly shortened. FIG. 2 illustrates the basic concept of the present invention.

According to the method of the present invention, the types of information read from the originals $O_1$ and $O_2$ are stored and accumulated in memory means which can be called out at independent timings and, when each type of original information is called out during the formation of a combined image, the call-out timing is deviated, whereby as shown, the image $W(O_1)$ (indicated by solid line) based on the information of the original $O_1$ and the image $W(O_2)$ (indicated by dot-and-dash line) based on the information of the original $O_2$ are brought into a deviated positional relation so that the portions to be combined are coincident. In this manner, image combination can be realized without requiring a large-capacity processing area for the combination editing in the control mechanism.

Figure 3:
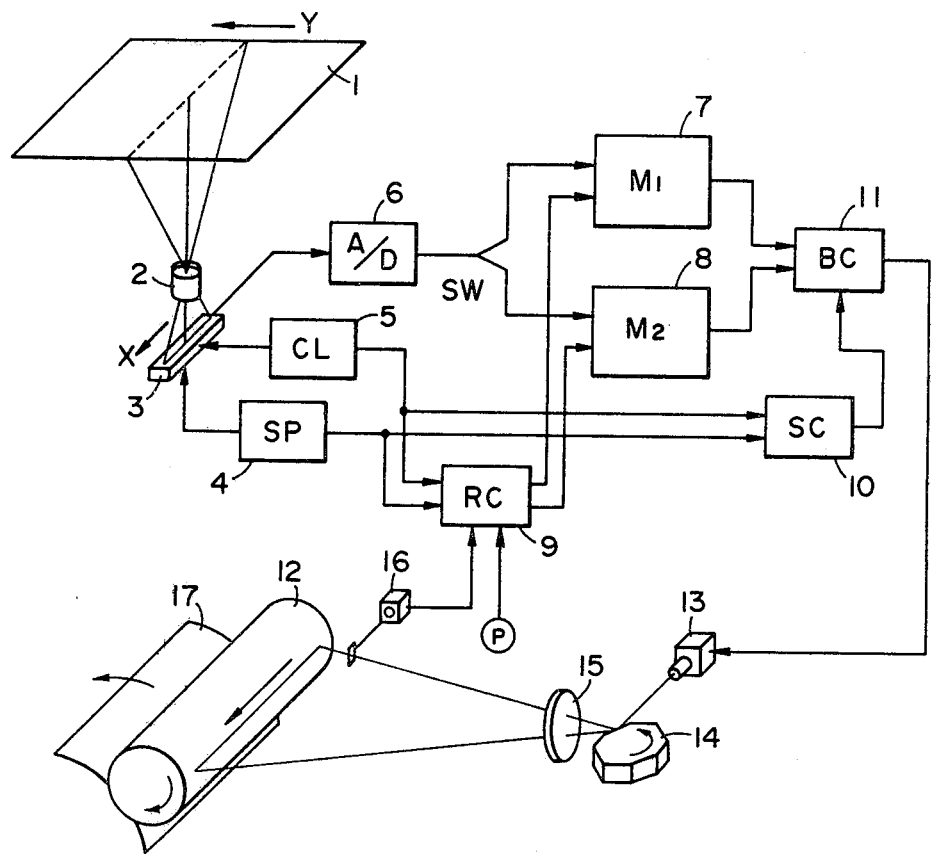
FIG. 3 is a schematic diagram illustrating a specific embodiment of the apparatus according to the present invention.

FIG. 3 is a schematic diagram illustrating a specific embodiment of the image formation apparatus according to the present invention. Reference numeral 1 designates an original carriage, reference numeral 2 denotes an imaging optical system, and reference numeral 3 designates reading means such as solid image pick-up element (CCD) or CRT flying spot disposed at the imaging position of the imaging optical system. The original optical image formed on the reading means 3 is subjected to the main scanning in the direction of arrow X and read time-sequentially. On the other hand, the original carriage 1 is moved in the direction of arrow Y at a predetermined speed to enable the auxiliary scanning of the original optical image.

Reference numeral 4 designates step drive pulse generating means, reference numeral 5 designates clock pulse generating means, and reference numeral 6 designates A/D converter means. By the drive pulse of the step drive pulse generating means 4, the reading means 3 starts its main scanning and accomplishes the reading by photoelectrically converting the optical image in accordance with the period of the pulse of the clock pulse generating means 5. This reading signal is an analog signal, which is converted into a digital signal by the A/D converter means 6. Reference numerals 7 and 8 designate memory means for receiving therein the output signal of the A/D converter means 6. In the example shown, switching means SW is provided so that the memory means are properly used in accordance with the originals.

Reference numeral 9 designates memory read-out control means which controls the read-out of each memory means at a timing which will later be described in detail.

Reference numeral 10 denotes selection control means which selects each memory signal, and reference numeral 11 designates means which combines the selected memory signals and generates an image signal.

In the example shown, the image recording corresponding to this image signal is effected on a photosensitive member 12 having a photoconductive layer. Although not shown, charging means, developing means, transfer means, cleaning means, etc. are disposed along the periphery of the photosensitive drum 12. Designated by 13 is laser beam generating means for imparting light information to the surface of the photosensitive drum, and it is modulated in accordance with the image signal from said image signal generating means.

Reference numeral 14 designates a polygon mirror rotated in the direction of arrow, and it scans the beam of the laser beam generating means in parallelism to the axis of the photosensitive drum. Reference numeral 15 denotes an f-θ lens for rendering constant the scanning speed of the beam on the drum surface. Reference numeral 16 designates a beam detector for detecting the scanning start position of the laser beam and controlling the read-out of the image signal. Reference numeral 17 denotes a transfer medium to which the image formed on the surface of the photosensitive drum may be transferred.

The recording operation in the apparatus of the above-described construction will be described with reference to FIGS. 4 to 6.

Figure 4A:
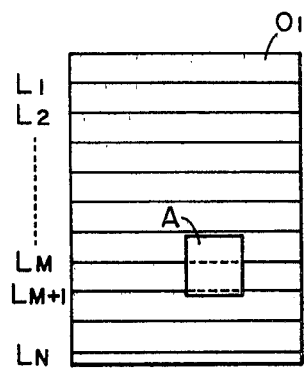
FIGS. 4A and 4B illustrate the method of reading originals utilized for the combined reproduction.
Figure 4B:
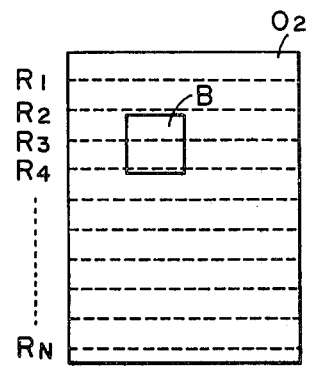

FIGS. 4A and B show the originals utilized for the combined reproduction. Description will hereinafter be made of a case where the portion B of an original $O_2$ is combined with the portion A of an original $O_1$.

These originals $O_1$ and $O_2$ are successively placed on the original carriage 1 and read by the reading means 3. This reading operation is effected by mainly scanning the line $L_1$ of the original $O_1$, and then scanning the lines $L_2$, $L_3$ and so on in succession. Likewise, the lines of the original $O_2$ in succession from the line $R_1$ are read. The reading signals of the original $O_1$ are memorized in the memory means 7, while the reading signals of the original $O_2$ are memorized in the memory means 8.

Figure 5:
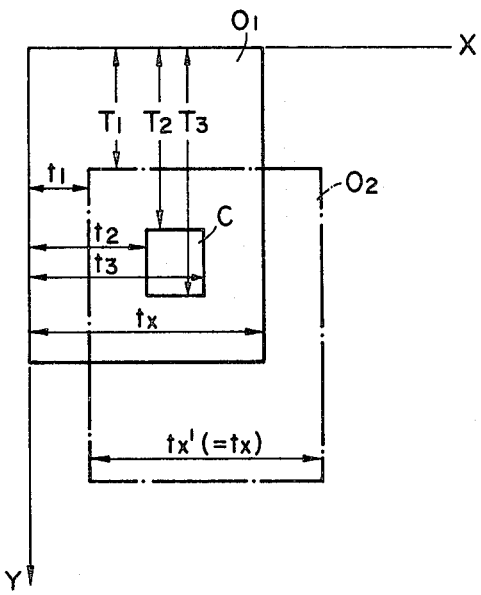
FIG. 5 is a schematic diagram illustrating the method of combined writing in the specific embodiment of the apparatus according to the present invention.

In the present apparatus, the above-described combination is accomplished by utilizing the reading signals memorized in these memory means, and FIG. 5 schematically illustrates the method of combination.

In FIG. 5, the X-axis is the time axis in the direction of main scanning, and the Y-axis is the time axis in the direction of auxiliary scanning.

By shifting the main scanning start time and the auxiliary scanning start time of the original $O_1$ (solid line) and the original $O_2$ (dot-and-dash line), the portion A of the original $O_1$ and the portion B of the original $O_2$ are brought into coincidence with each other as shown (portion C). At the position of the original $O_1$, the portion B written on the portion C provides the combined image. That is, the read-out of the memory signals of the original $O_1$ is started from the memory means 7, and after a time $T_1+t_1$ which is the sum of the main scanning direction delay time $t_1$ and the auxiliary scanning direction delay time $T_1$, the read-out of the memory signals of the original $O_2$ is started from the memory means 8. The read-out start time from each of these memory means is controlled by the memory read-out control means 9. The signals read out from each memory means are sent to the image signal generating means 11, where a predetermined signal is utilized as the image signal under the action of the selection control means 10. FIG. 6 is a time chart illustrating each step of pulse from the read-out of the memory signals till the generation of the image signal, the time chart contrastively showing the time axis of each step in parallelism to the horizontal direction.

Figure 6:
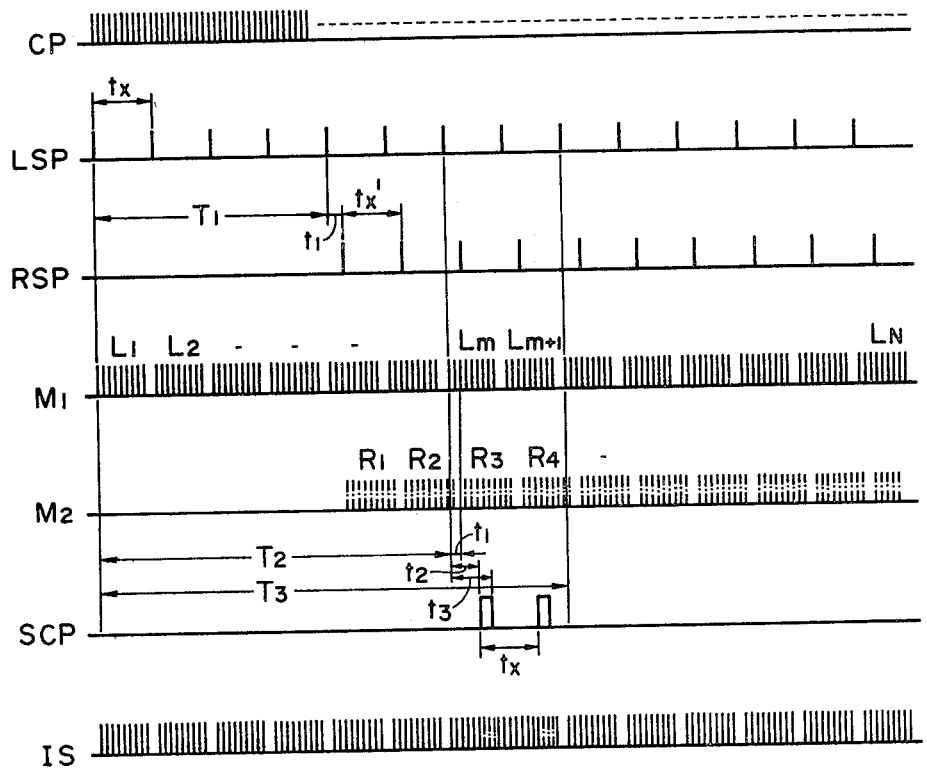
FIG. 6 is a time chart showing the various pulses in the specific embodiment of the apparatus according to the present invention.

The uppermost pulse in FIG. 6 is a clock pulse (CP) which provides the basis of the apparatus operation, and it is generated at a predetermined period by the clock pulse generating means 5.

The second pulse is a step pulse (LSP) corresponding to each line read-out start of the memory signal ($M_1$) of the original $O_1$ memorized in the memory means 7, and the pulse generated by the step drive pulse generating means 4 in association with the laser beam detector is utilized as this pulse. The period of this pulse is tx.

The third pulse is a step pulse (RSP) corresponding to each line start of the memory signal ($M_2$) of the original $O_2$ memorized in the memory means 8, and like the case of the pulse LSP, the pulse generated by the step drive pulse generating means 4 is utilized as this pulse. However, as previously described, the read-out of this memory signal ($M_2$) is started with a delay of time $T_1+t_1$ with respect to the read-out of the memory signal ($M_1$) of the original $O_1$. Also, the period tx' of this pulse is the same as that of the step pulse LSP.

The fourth and fifth pulses are the memory signals read out from the respective memory means, the fourth pulse being the memory signal ($M_1$) of the original $O_1$ memorized in the memory means 7, and the fifth pulse being the memory signal ($M_2$) of the original $O_2$ memorized in the memory means 8.

The sixth pulse is a selection control pulse (SCP) which sets the utilization of the read-out memory signals $M_1$ and $M_2$ as the image signals. In FIG. 6, after lapse of a time $T_2+t_2$ and after lapse of a time $T_2+t_2+t_x$, pulses each having a time width $(t_3-t_2)$ are generated and during this time, the memory signal $M_2$ is rendered to an image signal and, in the absence of this pulse, the memory signal $M_1$ is rendered to an image signal. That is, after lapse of a time $T_2$, the read-out signal $(M_1)$ of the original $O_1$ starts the read-out of the line Lm of FIG. 4A, and until this time, the read-out signals of the original $O_1$ are utilized for the combined image. On the other hand, at this time, the read-out signal $(M_2)$ of the original $O_2$ starts the read-out of the line $R_3$ of FIG. 4B. As shown in FIG. 5, after lapse of a time $t_2$, the memory signal $M_1$ of the original $O_1$, starts the read-out of the portion A and the memory signal $M_2$ of the original $O_2$ starts the read-out of the portion B. At this time, the setting is changed over by the selection control pulse (SCP) and more specifically, changed over from the memory signal $M_1$ so far used as the image signal to the memory signal $M_2$. Accordingly, the portion B of the original $O_2$ is written into the portion C of the combined image. Further, after a time $t_3-t_2$ elapses, the memory signal $M_2$ terminates the read-out of the lines in the portion B, and the read-out of the lines in the other portion than the portion B is started. On the other hand, the memory signal $M_1$ also terminates the read-out of the lines in the portion A, and the read-out of the lines in the other portion than the portion A is started. At this time, the selection control pulse (SCP) also disappears and therefore, the image signal is utilized while returning from the memory signal $M_2$ to the memory signal $M_1$. Further, after a time $t_x$ elapses, the read-out signal $(M_1)$ of the original $O_1$ begins to read out the portion A of $L_w+1$ lines, and the read-out signal $(M_2)$ of the original $O_2$ begins to read out the portion B of $R_4$ line. At this time again, by the selection control pulse (SCP), the image signal is changed over from the memory signal $M_1$ to the memory signal $M_2$, and the lines in the portion B of the original $O_2$ are written into the portion C of $L_w+1$ lines of the combined image. Further, after a time $(t_3-t_2)$ elapses, the pulse (SCP) disappears and the combined image has its remaining portion completed by the memory signal $M_1$ of the original $O_1$. The times when these pulses are generated are readily controlled by the setting of a present timer in each control means.

In this manner, a combined image signal is generated by the image signal generating means 11 and the laser beam is modulated by this signal, thus accomplishing the image formation.

In the above-described example, two different original signals have been changed over to form a combined image, but of course, these original signals may also be used partly simultaneously to form a combined image. That is, both the portions A and B of the originals $O_1$ and $O_2$ in the above-described example may be written into the portion C of the combined image. The originals are not limited to two, but three or more different originals may of course be used. In such case, it would be necessary to prepare memory means adapted to be capable of reading out the memory signals of the three or more originals simultaneously in accordance with the number of the originals used.

In the apparatus based on the present invention, memory signals can be read out simultaneously from a plurality of memory means in the described manner and therefore, the combined image formation processing can be accomplished at a very high speed as compared with a case where, as in the prior art, each point of the memory picture elements of the originals to be combined is address-accessed in a memory and converted and changed in combination to form a combined image.

Also, in the foregoing example, the overlay areas to be combined have been described as rectangles and this is because this shape is most fundamental and simple to control.

Of course, areas of any desired shape may be combined arbitrarily. In this case, the number of preset timers for setting the change-over selection in accordance with the shapes to be combined may be increased.

Now, the timer times setting the delay times in the main and the auxiliary scanning direction for combining the originals (namely, the set times of the preset timers such as $T_1$, $T_2$, $T_3$, $t_1$, $t_2$, $t_3$, etc. in the foregoing example) can be set in accordance with the measurements of the lengthwise and lateral positions on the originals to be combined. That is, the setting means is designed so as to convert the position measurement amounts on the originals into the set time amounts of the preset timers. In case of such setting means, the combined position designation directly provides the preset timer time designation and this is very high in practicality.

The preset timer concerned with the delay times $T_1$ and $T_2$ in the auxiliary scanning direction may be a preset counter driven by LSP or RSP, while the preset timer concerned with the delay times $t_1$, $t_2$, ... in the main scanning direction may be a preset counter driven by clock CL. Of course, other simple timer means may also be used.

Where, in the specific memory means, an address is given to each main scanning and during the blank time between the main scannings, the next main scanning line can be accessed at random from the memory, it is also possible that, for example, during the memory of the originals, the unnecessary main scanning lines are not reproduced but only the memory of the necessary main scanning lines is reproduced while controlling the reproduction time thereof.

In the foregoing description, the image formation has been shown with respect to a case where the light information modulated by a laser beam is reproduced on an electrophotographic photosensitive member, whereas various image formation methods may of course be utilized.

As has been described above in detail with respect to a specific example, the present invention is excellent in that desired overlay images can be easily obtained from various types of originals. Moreover, the image formation can be accomplished at a very high speed and this is highly effective in practical use.

What we claim is:

1. A method of forming an image by combining different original images, said method comprising the steps of photoelectrically converting a plurality of original images to be combined into time-sequential signals and storing the time-sequential signals in predetermined memory means, reading out the memory signals corresponding to the original images stored in said memory means with a predetermined time relationship therebetween and combining the desired memory signals to obtain an image signal, and forming an image in accordance with the combined image signal.

2. A method of forming an image by combining different original images, said method comprising the steps of converting a plurality of original images to be combined into time-sequential signals and storing the time-sequential signals in a plurality of memory means corresponding to the number of the original images, imparting to each of said memory means a read-out pulse starting at a predetermined timing and reading out the memory signals corresponding to the original images from said memory means with a predetermined time relationship therebetween and combining the desired memory signals to obtain an image signal, and forming an image in accordance with the combined image signal.

3. A method of forming an image by combining different original images, said method comprising the steps of converting a first original image into a time-sequential signal and storing the time-sequential signal in first memory means, converting a second original image into a time-sequential signal and storing the time-sequential signal in second memory means, reading out the memory signal of said first original image stored in said first memory means, reading out the memory signal of said second original image stored in said second memory means with a predetermined time relationship with the read-out of the memory signal of said first original image, combining the memory signal of said first original image read out and the memory signal of said second original image read out to obtain an image signal, and forming an image on a recording medium in accordance with the combined image signal.

4. A method of forming an image by combining different original images, said method comprising the steps of photoelectrically converting a plurality of original images to be combined into time-sequential signals and storing the time-sequential signals in predetermined memory means, reading out the memory signals corresponding to the original images stored in said memory means with a predetermined time relationship therebetween and combining the desired memory signals to obtain an image signal, and modulating light modulating means in accordance with the combined image signal and forming a combined image on a photosensitive recording medium.

5. A method of forming an image on a recording medium by combining different original images, said method comprising the steps of converting a plurality of original images to be combined into time-sequential signals and storing the time-sequential signals in predetermined memory means, reading out the memory signals corresponding to the original images stored in said memory means on the basis of a predetermined step pulse, selectively combining the read-out memory signals to obtain an image signal, and effecting the recording medium scanning based on said image signal at a scanning period related to said step pulse and forming a combined image on the recording medium.

6. A method of forming an image on a recording medium by combining different original images, said method comprising the steps of reading a plurality of original images to be combined, successively storing the reading signals of said original images in a plurality of memory means in such a manner that said reading signals can be read out simultaneously, reading out the memory signals of the original images from said memory means with a predetermined time relationship, selecting the memory signals read out from said memory means in accordance with a predetermined time limit and directing the same to image signal generating means, and forming an image by the image signal generated by said image signal generating means.

7. An apparatus for forming an image by combining different original images, said apparatus comprising:
   reading means having a photoelectric converting element and scanning original images to convert the same into time-sequential signals;
   a plurality of memory means;
   reading signal input control means for sending the reading signal of said reading means to a predetermined memory means;
   memory read-out control means for reading out the memory signal of each of said memory means at a predetermined timing;
   image signal generating means for selectively receiving as input the read-out memory signals and putting out a combined image signal; and
   means for forming an image on a recording medium by the image signal generated by said image signal generating means.

8. An apparatus according to claim 7, wherein said memory read-out control means generates a plurality of step pulses corresponding to said memory means.

9. An apparatus according to claim 7, wherein said image signal generating means receives as input the memory signals read out in accordance with a predetermined timer time.

10. An apparatus according to claim 7, wherein the read-out operation of said memory read-out control means and the image signal generating operation of said image signal generating means are effected by utilizing a common clock pulse.

* * * * *